United States Patent
Mukamoto et al.

(10) Patent No.: US 10,985,855 B2
(45) Date of Patent: Apr. 20, 2021

(54) COMMUNICATION DEVICE, METHOD OF COMMUNICATION, AND COMPUTER PROGRAM PRODUCT

(71) Applicant: Kabushiki Kaisha Toshiba, Minato-ku (JP)

(72) Inventors: Masaki Mukamoto, Kawasaki (JP); Toshio Ito, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 29 days.

(21) Appl. No.: 16/546,547

(22) Filed: Aug. 21, 2019

(65) Prior Publication Data
US 2020/0186270 A1 Jun. 11, 2020

(30) Foreign Application Priority Data
Dec. 11, 2018 (JP) .............................. JP2018-231831

(51) Int. Cl.
*H04J 3/06* (2006.01)
*H04W 56/00* (2009.01)
*H04W 72/04* (2009.01)
*H04B 7/26* (2006.01)

(52) U.S. Cl.
CPC ............ *H04J 3/0652* (2013.01); *H04B 7/265* (2013.01); *H04W 56/001* (2013.01); *H04W 72/0446* (2013.01)

(58) Field of Classification Search
CPC ...... H04J 3/0652; H04J 3/0655; H04J 3/0658; H04J 3/0661; H04J 3/0664; H04J 3/0667; H04J 3/067; H04J 3/0685; H04J 3/0694; H04B 7/265; H04B 7/2671; H04B 7/2678; H04B 7/2681; H04B 7/2684;
(Continued)

(56) References Cited

U.S. PATENT DOCUMENTS

2002/0061012 A1* 5/2002 Thi ........................ H04M 7/125
370/352
2005/0210157 A1* 9/2005 Sakoda ............. H04W 74/0816
709/251
(Continued)

FOREIGN PATENT DOCUMENTS

JP 2013-187762 A 9/2013
JP 6085346 B2 2/2017

OTHER PUBLICATIONS

"IEEE Standard for Low-Rate Wireless Networks", IEEE 802.15. Apr. 2015, IEEE Computer Society, 708 pages.

*Primary Examiner* — Kevin D Mew
(74) *Attorney, Agent, or Firm* — Oblon, McClelland, Maier & Neustadt, L.L.P.

(57) ABSTRACT

A communication device of an embodiment includes one or more processors. The processors synchronize time between the communication device and a different communication device using data transmitted and received by time division multiple access. The processors determine the end timing of carrier-sensing in a time slot of the time division multiple access. The processors control carrier-sensing to end at a determined end timing. The processors generate data including timing information, allowing identification of the determined end timing, as data to be transmitted to the different communication device.

10 Claims, 10 Drawing Sheets

(58) Field of Classification Search
CPC ... H04B 7/2687; H04B 7/269; H04W 56/001; H04W 56/0015; H04W 56/002; H04W 72/0446
See application file for complete search history.

(56) References Cited

U.S. PATENT DOCUMENTS

| | | | |
|---|---|---|---|
| 2009/0034552 A1* | 2/2009 | Yonge, III | H04L 45/125 370/458 |
| 2011/0002252 A1* | 1/2011 | Kim | H04W 52/0216 370/311 |
| 2011/0164605 A1* | 7/2011 | Zhen | H04W 52/0216 370/347 |
| 2012/0044827 A1* | 2/2012 | In | H04W 56/0075 370/252 |
| 2013/0235905 A1 | 9/2013 | Serizawa et al. | |
| 2014/0056286 A1* | 2/2014 | Nagata | H04W 56/001 370/336 |
| 2015/0023315 A1* | 1/2015 | Yerramalli | H04W 72/042 370/330 |
| 2015/0092703 A1* | 4/2015 | Xu | H04W 72/0446 370/329 |
| 2015/0103767 A1* | 4/2015 | Kim | H04W 74/06 370/329 |
| 2015/0117369 A1* | 4/2015 | Merlin | H04W 74/0816 370/329 |
| 2016/0057780 A1* | 2/2016 | Kim | H04W 74/006 370/338 |
| 2017/0126363 A1* | 5/2017 | Wang | H04L 1/1671 |
| 2018/0020447 A1* | 1/2018 | Thubert | H04W 72/0446 |
| 2018/0139701 A1* | 1/2018 | Wang | H04W 72/0446 |
| 2018/0234935 A1* | 8/2018 | Uchiyama | H04W 56/0025 |
| 2019/0075562 A1* | 3/2019 | Cariou | H04W 74/002 |
| 2019/0075581 A1* | 3/2019 | Salem | H04W 72/1289 |
| 2019/0110268 A1* | 4/2019 | Abedini | H04L 5/0053 |

* cited by examiner

| OCTETS: 3 | VARIABLE |
|---|---|
| VENDOR OUI | VENDOR SPECIFIC INFORMATION |

COMMUNICATION DEVICE, METHOD OF COMMUNICATION, AND COMPUTER PROGRAM PRODUCT

CROSS-REFERENCE TO RELATED APPLICATIONS

This application is based upon and claims the benefit of priority from Japanese Patent Application No. 2018-231831, filed on Dec. 11, 2018; the entire contents of which are incorporated herein by reference.

FIELD

Embodiments described herein relate generally to a communication device, a method of communication, and a computer program product.

BACKGROUND

Wireless communication has been widely used especially in industrial fields because of its low installation cost and easy operation. For example, IEEE 802.15.4-2015 defines the scheme of data transmission and receipt of time-slotted channel hopping (TSCH). TSCH establishes communication using time division multiple access (TDMA) to avoid wave interference in the system and using frequency hopping that randomly changes the frequency to reduce the effect of disturbance from other systems. TSCH further has a highly accurate time synchronization function, which enables accurate time-division communication.

Conventional techniques, however, sometimes suffer from a reduction in accuracy of time synchronization. For example, for making carrier-sensing effective, such a technique may be employed that changes the carrier-sensing start timing in a time slot where collision is likely to occur. Such a technique problematically causes the packet transmission time to be shifted, which may affect the function of, for example, TSCH that carries out time synchronization based on the packet receipt time.

DETAILED DESCRIPTION

According to one embodiment, a communication device includes one or more processors. The processors synchronize time between the communication device and a different communication device using data transmitted and received by time division multiple access. The processors determine the end timing of carrier-sensing in a time slot of the time division multiple access. The processors control carrier-sensing to end at a determined end timing. The processors generate data including timing information, allowing identification of the determined end timing, as data to be transmitted to the different communication device.

Preferred embodiments of a communication device will now be described in detail with reference to the accompanying drawings.

In TDMA-based communication, since a plurality of communication devices (nodes) in a system simultaneously transmit packets (data), wave collisions may inevitably occur. A communication device performing wireless communication usually transmits a packet after carrying out carrier-sensing to understand the conditions of surrounding radio waves and confirming that no interference would occur. In TDMA having a function of highly accurate time synchronization, communication devices simultaneously transmit data. Previous carrier-sensing is therefore less effective in detecting radio waves and avoiding wave collisions.

In an attempt to overcome the above problem, such a method to make carrier-sensing effective is employed that changes the carrier-sensing start timing in a time slot during which collisions are likely to occur and that causes the communication devices to transmit data at respective different timings. Since TSCH achieves time synchronization based on the receipt time of a packet, the above method to shift transmission timings may reduce accuracy of time synchronization.

In this embodiment, a communication device, a method of communication, and a computer program are provided that can make carrier-sensing effective between communication devices that transmit data in the same time slot and accordingly maintain accurate time synchronization.

Figure 1:
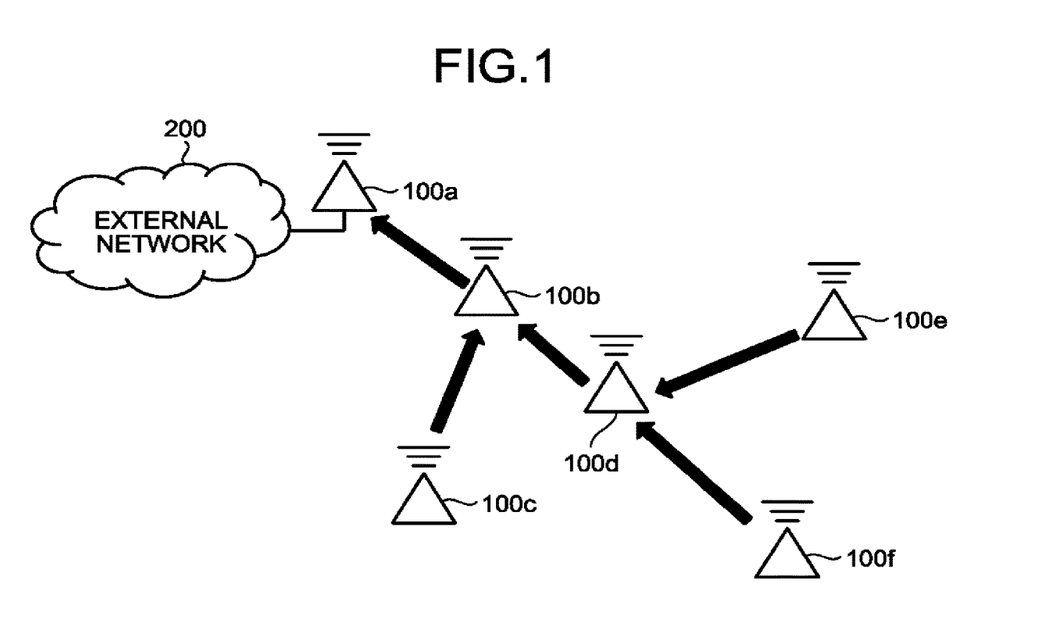
FIG. 1 is a drawing that illustrates an example structure of a wireless communication system including communication devices of an embodiment.

FIG. 1 is a drawing that illustrates an example structure of a wireless communication system including communication devices of the embodiment. As illustrated in FIG. 1, the wireless communication system includes a plurality of communication devices 100*a* to 100*f* to perform wireless communication and an external network 200. Since the communication devices 100*a* to 100*f* have the same configuration, they will be collectively referred to as a communication device 100 unless otherwise specified. The number of communication devices 100 is not limited to six, and any number of devices is applicable.

The communication devices 100*a* to 100*f* are included in a multi-hop network. For example, the communication device 100 has the TSCH function as a protocol of the medium access control (MAC) layer defined by IEEE standards 802.15.4-2015. Applicable protocols are not limited to TSCH, and other protocols such as time division multiple access and time synchronization are also applicable.

One of communication devices 100 in the multi-hop network serves as a coordinator. The coordinator is a communication device 100 that manages a time (the real time)

used as a reference of synchronization in the multi-hop network. In FIG. 1, for example, the communication device 100a is the coordinator.

A communication device 100 that is not the coordinator selects at least one communication device 100 referred to as a time source from other communication devices 100 present within the communication area and uses the selected communication device 100 as a source for referring to the time therein. Each communication device 100 receives a packet from the time source and performs time synchronization in the following procedure.

Figure 2:
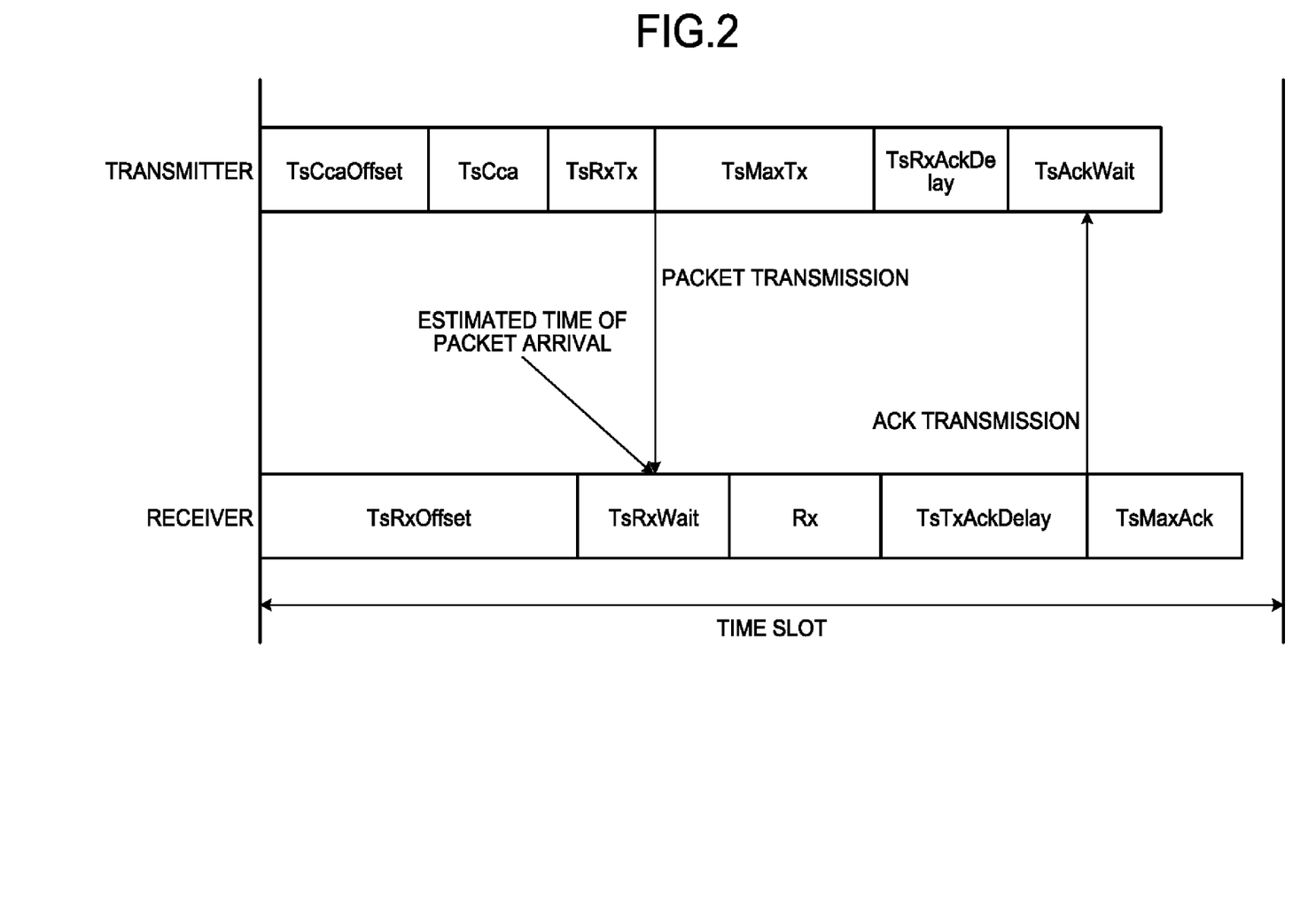
FIG. 2 is a drawing that illustrates a structure of time synchronization conforming to TSCH.
Figure 3:
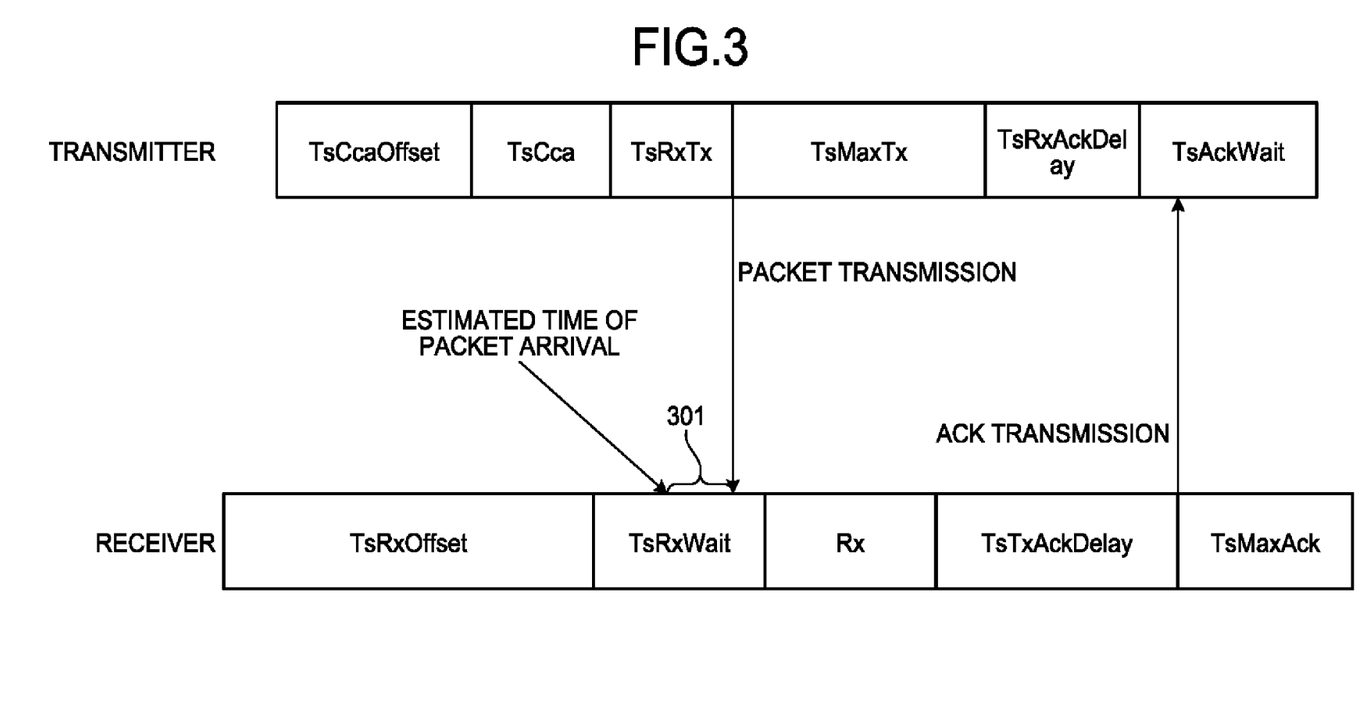
FIG. 3 is another drawing that illustrates a structure of time synchronization conforming to TSCH.

FIG. 2 and FIG. 3 are drawings to illustrate the structure of time synchronization performed by each communication device 100 in accordance with TSCH. All the communication devices 100 in the multi-hop network carry out time division multiple access (TDMA), and perform packet transmission, carrier-sensing, and acknowledgement (ACK) transmission in a time slot as necessary. The timing of the above operation (for example, at how many milliseconds from the beginning of a time slot carrier-sensing is performed) is predetermined. Information (timing information) indicating the predetermined timing is shared between the communication devices 100. Each communication device 100 is allowed to estimate the time when a packet, transmitted from another communication device 100 as a transmitter, arrives by referring to such information.

FIG. 2 illustrates how a packet is transmitted and received by a transmitter communication device 100 and a receiver communication device 100 having time synchronized therebetween. With timing information shared beforehand and time accurately synchronized, as illustrated in FIG. 2, the packet arrives at the estimated time.

FIG. 3 illustrates how a packet is transmitted and received by a transmitter communication device 100 and a receiver communication device 100 with time synchronization deviated from each other. With deviated time synchronization, a packet arrives some time earlier or later than the estimated time. FIG. 3 illustrates an example where a packet arrives later than the estimated time. The difference between the estimated time and the actual arrival time is equal to a difference 301 in time synchronization. Upon detection of the difference 301 through communication with a time source, the communication device 100 corrects the time information thereof by the difference 301. With all the communication devices 100 in the multi-hop network carrying out the above process, time synchronization is maintained over the whole multi-hop network.

As described above, estimation of time of packet arrival is an important factor to achieve time synchronization between the communication devices 100. Packet transmission at a timing different from previously shared information thus may make time synchronization less accurate.

Figure 4:
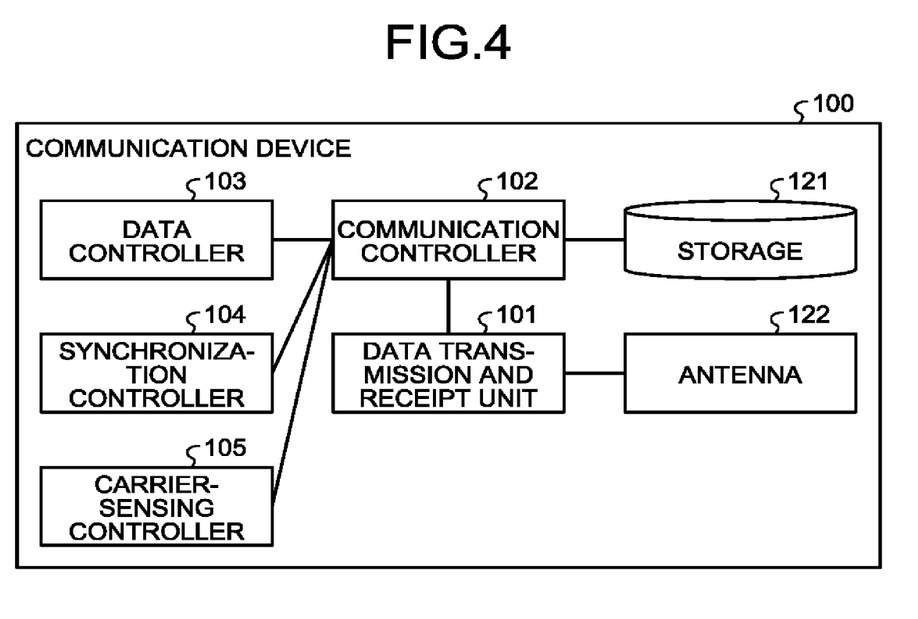
FIG. 4 is a block diagram of a communication device according to the embodiment.

FIG. 4 is a block diagram that illustrates an example configuration of the communication device 100 according to the embodiment. As illustrated in FIG. 4, the communication device 100 includes storage 121, an antenna 122, a data transmission and receipt unit 101, a communication controller 102, a data controller 103, a synchronization controller 104, and a carrier-sensing controller 105.

The communication device 100 carries out wireless communication as a specified small radio communication station in Japan. The communication device 100 therefore needs to conform to Japanese Radio Law and Japanese Standards ARIB Std-T108 with regards to, for example, carrier-sensing and the transmission time.

FIG. 4 illustrates example functions relating to wireless communication. In addition to this configuration, any function of an upper layer such as an application using wireless communication may be included in the communication device 100. The communication controller 102 controls wireless communication, for example, in response to a request of transmitting and receiving a packet from such an upper layer.

The storage 121 stores various information used for various processing performed by the communication device 100. For example, the storage 121 stores the status of communication obtained based on, for example, results of data transmission and receipt. The status of communication includes, for example, at least one of the number of failures in packet transmission from the communication device 100, and the number of hops from the coordinator to the communication device 100. The above status of communication is only an example, and any information relating to the conditions of communication carried out by the communication device 100 may be used as the status of communication.

The antenna 122 is used for transmission and receipt of radio signals.

The communication controller 102 controls wireless communication carried out by the communication device 100. For example, the communication controller 102 controls the data transmission and receipt unit 101, the data controller 103, the synchronization controller 104, and the carrier-sensing controller 105 to transmit and receive radio signals. Control processing of the communication controller 102 will be described later in detail.

The data transmission and receipt unit 101 transmits and receives packets under control of the communication controller 102.

The data controller 103 controls the content of a packet (data) to be transmitted and received. For example, the data controller 103 generates a packet to be transmitted and analyzes a received packet. The data controller 103 generates a packet to be transmitted. Specifically, the packet includes timing information allowing identification of the end timing of carrier-sensing, determined by the communication controller 102.

The synchronization controller 104 controls processing to synchronize time with another communication device 100 using data transmitted and received through time division multiple access. For example, the synchronization controller 104 synchronizes the time of the corresponding communication device 100 with the time of another communication device 100 under control of the communication controller 102.

The carrier-sensing controller 105 controls the time period of carrier-sensing (the carrier-sensing time) and the timing to start carrier-sensing under control of the communication controller 102. For example, the carrier-sensing controller 105 controls carrier-sensing to end at the timing determined by the communication controller 102.

An example procedure of control processing performed by the communication controller 102 in wireless communication will now be described. The communication controller 102 controls a packet to be transmitted and the transmission timing, in packet transmission. Upon receipt of a packet, the communication controller 102 controls, for example, analysis of the received packet and time synchronization.

For transmission of a packet, the communication controller 102 receives a packet (a transmission packet) to be transmitted, from the data controller 103. The communication controller 102 reads the status of communication from the storage 121, allocates priority for the transmission packet with reference to the status of communication, determines whether to change the carrier-sensing time based on the priority, and, upon determination of a change, determines the amount of change.

Changing the carrier-sensing time means at least changing the timing when carrier-sensing ends. If a plurality of communication devices 100 finish carrier-sensing at the same timing, the communication devices 100 simultaneously transmit packets after carrier-sensing, which inevitably causes collisions between radio waves. As long as carrier-sensing ends at respective different timings between the communication devices, the start timing of carrier-sensing may be changed or may be unchanged. If the start timing and the end timing are changed by the same length, the carrier-sensing time remains the same. Changing the start timing and the end timing by respective different lengths changes the carrier-sensing time. In the following description, the start timing is unchanged, whereas the end timing is changed from a predetermined standard value. In this case, the difference between the changed end timing and the standard value corresponds to the amount of change.

In changing the carrier-sensing time, the communication controller 102 requests the data controller 103 to modify a transmission packet such that timing information, allowing identification of the end timing, is included in the packet.

Before transmission of the packet, the communication controller 102 requests the carrier-sensing controller 105 to perform carrier-sensing processing. If the carrier-sensing time is changed, the carrier-sensing controller 105 runs carrier-sensing based on the changed carrier-sensing time, and notifies the communication controller 102 of the result.

The communication controller 102 determines whether the transmission packet can be transmitted, based on the result of carrier-sensing. Upon determination that the packet is transmittable, the communication controller 102 sends an order to transmit the transmission packet, to the data transmission and receipt unit 101. The data transmission and receipt unit 101 follows the transmission order and transmits the transmission packet.

Operations performed upon receipt of the packet will now be described. The data transmission and receipt unit 101 receives the packet (received packet) and transmits the received packet to the communication controller 102. The communication controller 102 transmits the received packet to the data controller 103. The data controller 103 analyzes the structure of the received packet and notifies the communication controller 102 of the results of analysis. The communication controller 102 calculates the time to be corrected based on the results of analysis and the receipt time of the received packet and notifies the synchronization controller 104 of the time to be corrected. The synchronization controller 104 corrects the internal time of the communication device 100 based on the value of the notified time.

The storage 121 may be implemented by any widely used memory medium such as a flash memory, a memory card, a random access memory (RAM), a hard disk drive (HDD), and an optical disc.

The above units (the data transmission and receipt unit 101, the communication controller 102, the data controller 103, the synchronization controller 104, and the carrier-sensing controller 105) are implemented by one or more processors. For example, the above units may be implemented with a processor such as a central processing unit (CPU) executing a computer program, in other words, implemented by software. The above units may be implemented by a processor such as a dedicated integrated circuit (IC), in other words, by hardware. The units may further be implemented by a combination of software and hardware. When a plurality of processors are used, each processor may implement one of the above units, or may implement two or more units of the above units.

Figure 5:
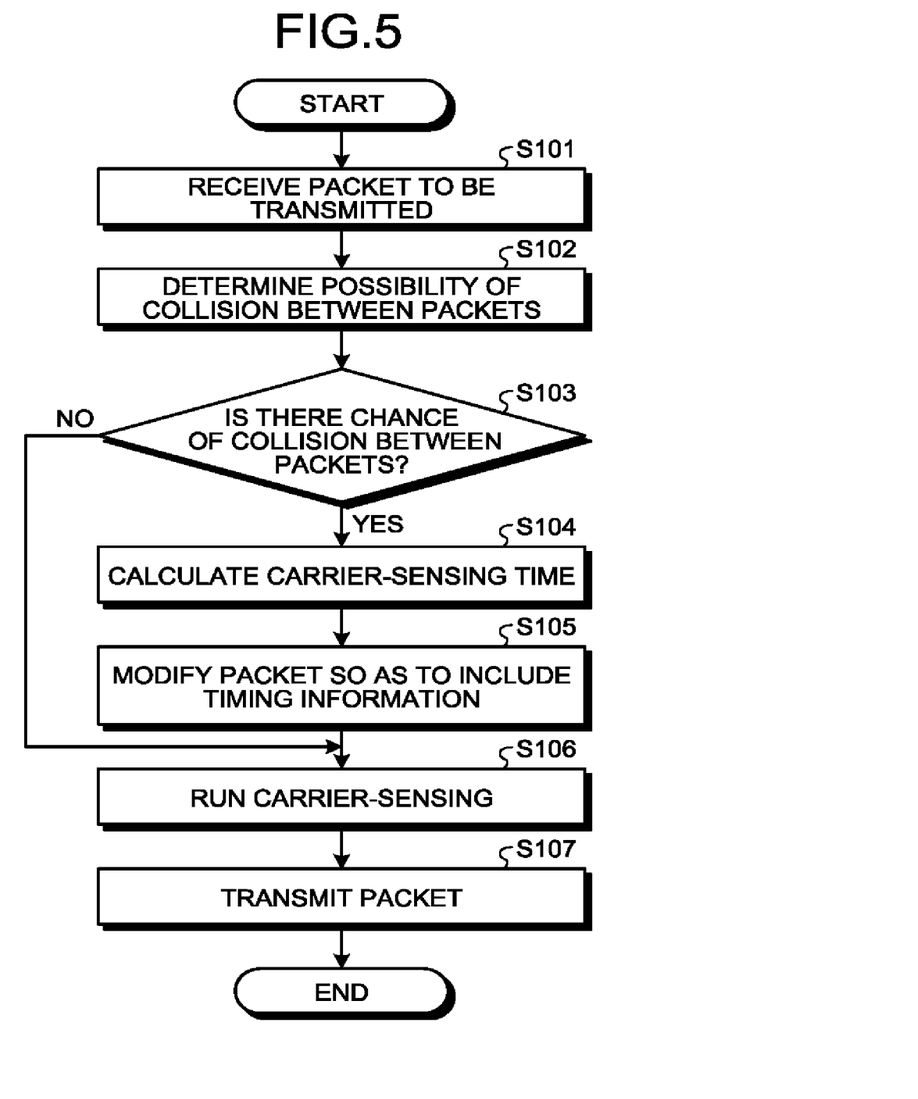
FIG. 5 is a flowchart of packet transmission processing of the embodiment.

The communication device 100 of the embodiment configured as above performs processing of packet transmission as described below. FIG. 5 is a flowchart of example packet transmission processing of the embodiment.

The communication controller 102 receives a transmission packet and an order to transmit the transmission packet from, for example, an upper layer (Step S101). The communication controller 102 refers to the status of communication stored in the storage 121 and determines whether transmission of the transmission packet may collide with communication of another communication device 100 (Step S102).

For example, if the storage 121 stores the number of transmission failures as the status of communication, the communication controller 102 determines that there is a possibility of collision if the number of transmission failures is larger than a predetermined threshold. The method of determination is not limited thereto, and any method is usable. For example, the communication controller 102 may determine that there is a possibility of collision if the number of other communication devices 100 currently in connection is larger than a threshold.

If there is a possibility of collision between transmission packets (Yes at Step S103), the communication controller 102 changes the carrier-sensing time to make carrier-sensing effective with the intention to avoid collision. For example, the communication controller 102 calculates the carrier-sensing time changed based on the status of communication (Step S104). The method of calculation will be described later in detail. The communication controller 102 requests the data controller 103 to modify the transmission packet such that timing information, indicating the end timing of the changed carrier-sensing, is included in the packet (Step S105). The method of modification of a transmission packet will be described later in detail.

The communication controller 102 requests the carrier-sensing controller 105 to run carrier-sensing (Step S106). If the carrier-sensing time is changed at Step S105, the communication controller 102 requests the carrier-sensing controller 105 to run carrier-sensing using the changed carrier-sensing time.

If the communication controller 102 determines that there is no possibility of collision between transmission packets at Step S103 (No at Step S103), the communication controller 102 does not change the carrier-sensing time and requests the carrier-sensing controller 105 to run carrier-sensing using the predetermined carrier-sensing time.

If the transmission packet is determined to be transmittable from carrier-sensing, the communication controller 102 requests the data transmission and receipt unit 101 to transmit the transmission packet (Step S107). If the transmission packet is determined not to be transmittable from carrier-sensing, the communication controller 102 may run carrier-sensing again after waiting for, for example, a random time.

The processing of determination at Step S103 may be omitted. For example, if such a method of calculating carrier-sensing time is used at Step S104 that gives predetermined carrier-sensing time in the case of low possibility of collision, the processing of determination at Step S103 may be omitted.

Processing of packet receipt performed by the communication device 100 of the embodiment will now be described.

Figure 6:
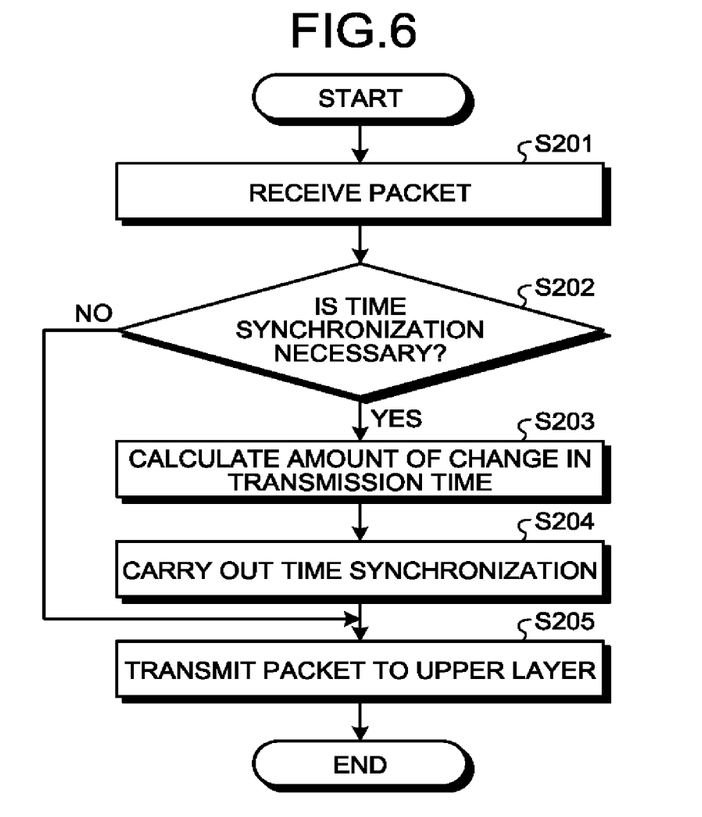
FIG. 6 is a flowchart of packet receipt processing of the embodiment.

FIG. 6 is a flowchart that illustrates example processing of packet receipt of the embodiment.

The data transmission and receipt unit 101 receives a packet (received packet) from, for example, another communication device 100 (Step S201). The communication controller 102 determines the necessity of time synchronization based on the received packet (Step S202).

The communication device 100 maintains accuracy of time synchronization using the function of TSCH. TSCH corrects time synchronization based on a packet received from a communication device 100 serving as a time source. The communication controller 102 checks, for example, the sender address of the received packet, and, if the address is the time source, determines that time synchronization is necessary.

If time synchronization is necessary (Yes at Step S202), the communication controller 102 checks whether the transmission timing of the received packet has been changed. As described above, if the transmitter communication device 100 has changed the carrier-sensing time, the received packet includes timing information allowing identification of the amount of change. The communication controller 102 determines whether the transmission timing has been changed and identifies the amount of change, from timing information included in the received packet (Step S203).

The communication controller 102 understands the difference in time synchronization between the device and the time source, from the estimated time of arrival and actual time of arrival of the received packet and the amount of change. The communication controller 102 controls the synchronization controller 104 to correct the time information of the device by the difference (Step at S204).

If time synchronization is not necessary (No at Step S202), or when time synchronization is completed, the communication controller 102 performs necessary processing in the layer of the communication controller 102 and transmits the received packet to an upper layer (Step at S205).

Figure 7:
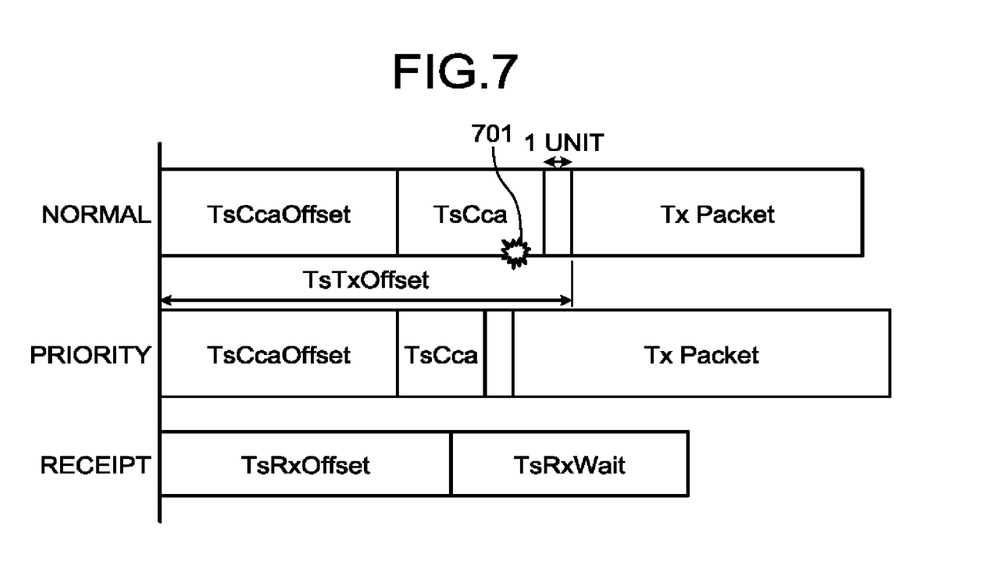
FIG. 7 is a drawing that illustrates a method to avoid collision of the communication device of the embodiment.

As illustrated in FIG. 5, the communication device 100 takes measure to avoid collision if there is a chance that the communication device 100 and another communication device 100 may simultaneously transmit packets. More specifically, the communication device 100 changes the carrier-sensing time to make carrier-sensing effective and avoid collision between packets. This function will now be described in detail. FIG. 7 is a drawing that illustrates a method to avoid collision of the communication device 100 of the embodiment.

A transmitter communication device 100 waits for a certain time period, TsCcaOffset, from the beginning of a time slot (transmission time slot) to transmit a packet, runs carrier-sensing for a time TsCca, and upon determination that there is no chance of interference, starts transmission of the packet. A receiver communication device 100 waits for a time TsRxOffset from the beginning of the time slot and starts receipt-waiting processing. The receiver communication device 100 waits for receipt for a time TsRxWait. If the head of a packet arrives within the time TsRxWait, the receiver communication device 100 starts receiving the packet. These times, TsCcaOffset, TsCca, TsRxOffset, and TsRxWait are shared between the communication devices 100 in advance. The term Tx Packet indicates a packet to be transmitted. The term TsTxOffset indicates a time from the beginning of a time slot to start of transmission of a packet.

The communication device 100 of the embodiment is capable of changing the carrier-sensing time TsCca (the end timing of TsCca). This process can change the start timing of transmission of a subsequent packet and make carrier-sensing effective for communication devices 100 with time synchronized therebetween.

The "normal" in FIG. 7 indicates a time slot allocated for a communication device 100 having the carrier-sensing time, TsCca, unchanged. The term "priority" indicates a time slot allocated for a communication device 100 having the carrier-sensing time, TsCca, changed.

When giving a higher priority to communication of a communication device 100, as illustrated in FIG. 7, the carrier-sensing time of this communication device 100 is set shorter than a predetermined time. This manner allows a packet of the communication device 100 with a higher priority to be transmitted during carrier-sensing of other communication devices 100. Other communication devices 100 are allowed to detect transmission of the packet at a time 701 in carrier-sensing. This method can make carrier-sensing effective and thus achieve successful packet transmission for communication devices 100 with time synchronized therebetween.

The carrier-sensing time of the communication device 100 is subjected to two restrictions. One of them is a restriction of ARIB Std-T108. This standard gives the minimum value (the lowest limit) to the carrier-sensing time. The carrier-sensing time of the communication device 100 is therefore not allowed to fall below the minimum value.

The other one is a restriction of time, TsRxWait. The receiver communication device 100 usually expects that receipt of a packet will start at the midpoint of the time TsRxWait. If transmission of a packet is expedited or deferred by a half of the time TsRxWait or longer, the receiver communication device 100 cannot receive the packet. The amount of change in the carrier-sensing time thus needs to be smaller than a half of the time TsRxWait. In other words, the restriction gives the maximum value (the upper limit) to the carrier-sensing time.

The communication controller 102 determines the amount of change under the above restrictions. For example, the communication controller 102 determines a time, which satisfies the above restrictions and is an integer multiple of the time ("1Unit" in FIG. 7) from the end of carrier-sensing to the start of packet transmission, to be the amount of change. A method for calculating the amount of change will be described later in detail.

As described above, a receiver communication device 100 needs to be notified of the amount of change in the transmission timing so as to maintain accuracy of time synchronization. This function will now be described in detail.

The amount of change can be notified by, for example, the following two methods.

The first method notifies a receiver communication device 100 of the amount of change by inserting data, the length of which is equal to the value of the amount of change, to a location right before the frame check sequence of a transmission packet. A packet to be transmitted by a communication device 100 carries the payload length (MAC payload length) at the head of the packet. The transmitter communication device 100 (the data controller 103) puts data, the length of which is equal to the amount of change, into the transmission packet and writes the length of payload excluding the amount of change to the payload length. The receiver communication device 100 understands the amount of change from the difference between the size obtained through packet analysis and the size actually detected.

Figure 8:
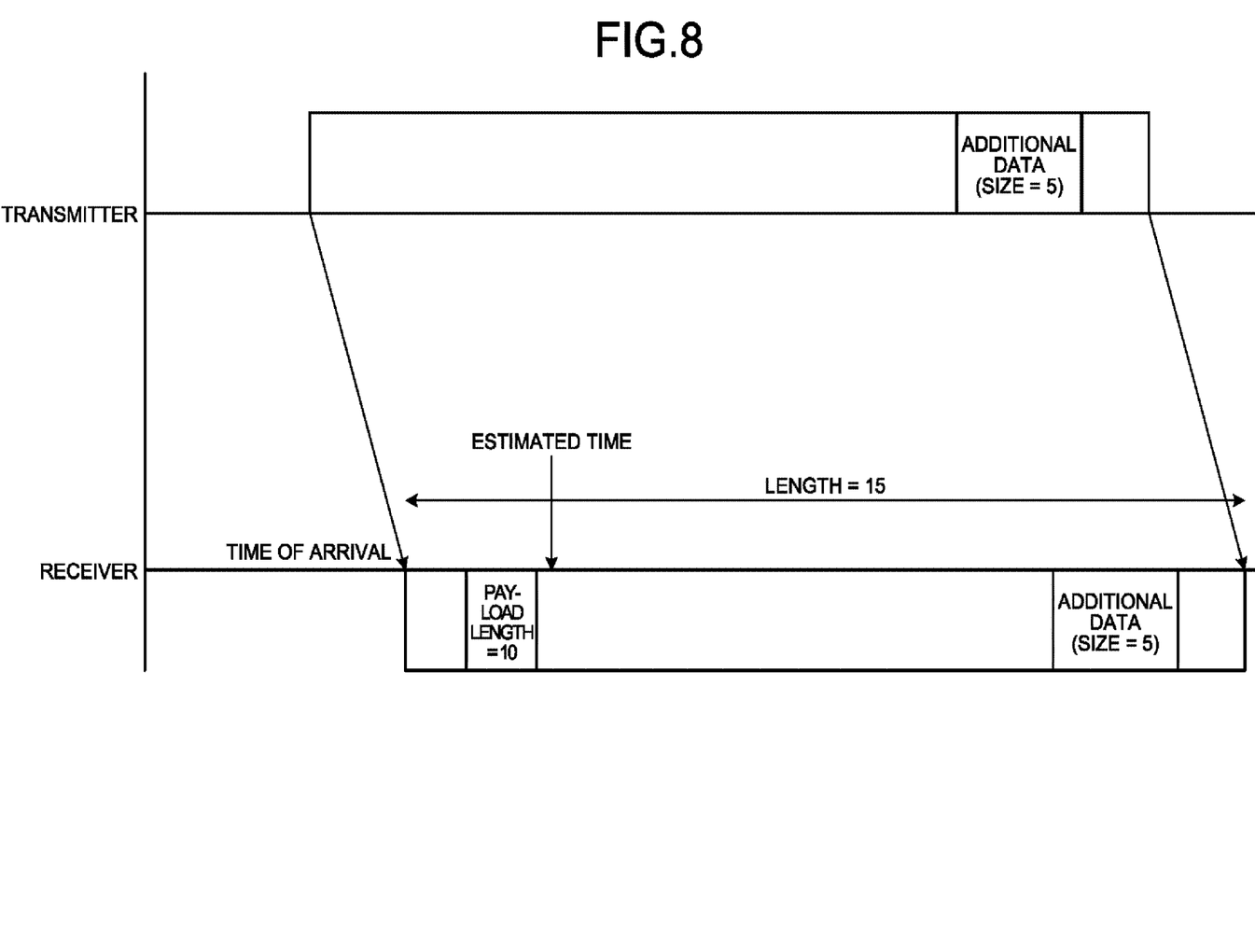
FIG. 8 is a drawing that illustrates the overview of a method of notification.

FIG. 8 is a drawing that illustrates an overview of the first method of notification. FIG. 8 illustrates an example where a transmitter communication device 100 puts additional data having a size of 5, corresponding to the amount of change, into a transmission packet. The receiver communication device 100 can detect that the amount of change is 5, from the difference between the size 10 written to the payload length and the size 15 actually detected. The receiver communication device 100 synchronizes the time using the detected amount of change and the difference between the actual time of arrival and the estimated time of arrival of the packet.

The method of inserting data, the length of which is equal to the value of the amount of change, to the location right before the frame check sequence obtains the payload of the packet excluding the inserted data by reading the packet data for the size written to the payload length from the head of the payload. This method therefore eliminates the necessity of making a notification of the location where the data is inserted. Such data is allowed to be inserted to any location, without being limited to the above location. If the data is inserted to a location other than a location right before the frame check sequence, information indicating the location of insertion needs to be shared in any manner (for example, by writing the information at the header or at a specific location in the payload).

If the carrier-sensing time is allowed to be both increased and reduced, in other words, if the amount of change can take both positive and negative values, such information needs to be shared that indicates that the amount of change is a positive value or a negative value. In this case, for example, information indicating that the value is positive or negative may be included in a predetermined location (for example, the first bit or the last bit) of the added data.

The second method makes a notification of the amount of change by writing the amount of change to the MAC header or to a certain field (certain location) in the payload. A transmitter communication device 100 and a receiver communication device 100 previously share a field (notification field) for notification of the amount of change. The transmitter communication device 100 (the data controller 103) writes the amount of change to the notification field of the transmission packet. The receiver communication device 100 refers to the notification field to understand the amount of change.

Figure 9:
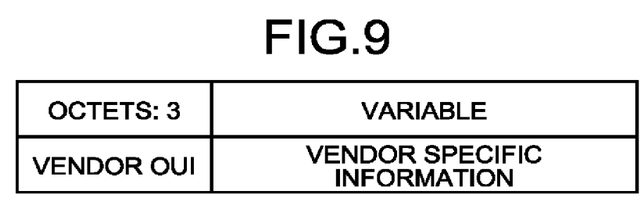
FIG. 9 is a drawing that illustrates an example frame format of vendor specific IE.

The notification field may use, for example, the vendor specific information element (IE). The vendor specific IE is a field on the MAC frame defined by TSCH. Usage of this field is not defined by the standards of TSCH, and this field is used for transmission and receipt of information necessary for a certain purpose. The vendor specific IE is a field used in the MAC header and the MAC payload, both of which are selectable.

FIG. 9 is a drawing that illustrates an example frame format of the vendor specific IE. This format is used in writing to both a header and a payload. The vendor organizationally unique identifier (OUI) is identification information of a vendor of the communication device 100. The vendor specific information is information used for a desired purpose. In this embodiment, the vendor specific information includes information indicating the amount of change.

Figure 10:
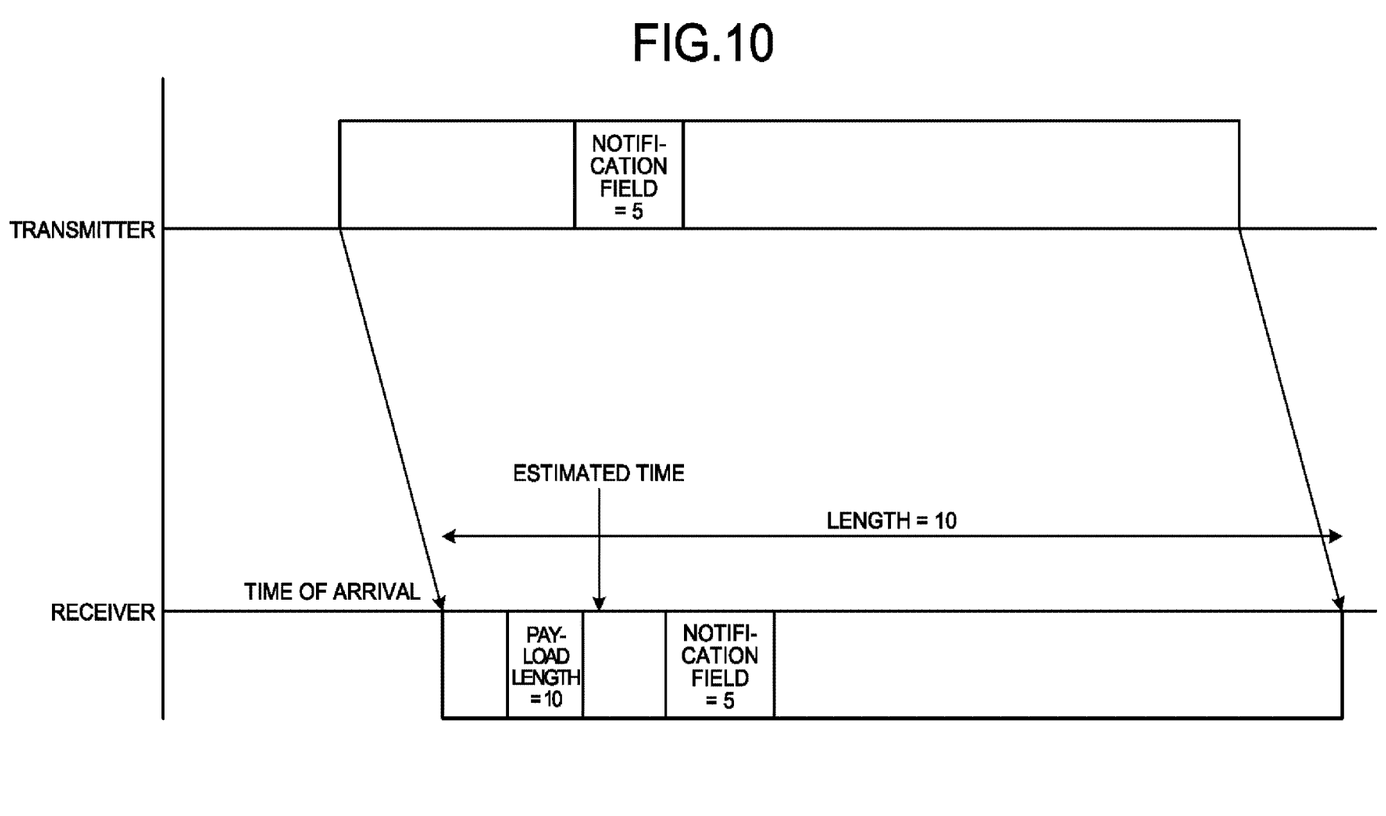
FIG. 10 is a drawing that illustrates the overview of a method of notification.

FIG. 10 is a drawing that illustrates an overview of the second method of notification. FIG. 10 illustrates an example where a transmitter communication device 100 transmits a transmission packet carrying a value of 5 as the amount of change on the notification field. The receiver communication device 100 can identify the amount of change as 5 by checking the notification field. If the carrier-sensing time is allowed to be both increased and reduced, the second notification method may write a value of the amount of change to the notification field including information indicating that the value is positive or negative. For example, if the amount of change is −5, the value −5 is written to the notification field.

A method of calculating the amount of change will now be described. As illustrated in FIG. 5, the transmitter communication device 100 calculates the possibility of collision between packets before changing the carrier-sensing time. For example, the communication device 100 calculates the amount of change based on the priority of a transmission packet. The communication controller 102 determines priority using, for example, information indicating the status of communication stored in the storage 121. A method of determining priority is not limited thereto. The communication controller 102 may determine priority based on, for example, the level of importance of the content of a transmission packet. The communication controller 102 may determine priority based on the level of importance of the function of an upper layer, such as an application requesting transmission of a transmission packet.

The carrier-sensing time taking account of the amount of change is given by the following equation (1).

$$CCATime = CCABase - CCAChange \tag{1}$$

In the equation, CCATime is the carrier-sensing time, CCABase is the carrier-sensing time where no change processing is performed, and CCAChange is the amount of change in the carrier-sensing time. The equation (1) indicates that the carrier-sensing time becomes shorter with an increase in the amount of change CCAChange. The CCAChange may be a negative value. A negative value makes the carrier-sensing time longer than usual.

CCAChange is calculated as described below. CCAChangeBase, which is a value determined based on the priority, is first calculated. CCAChangeBase is given by, for example, the following equation (2).

$$CCAChangeBase = Priority \times TxRx \tag{2}$$

Priority is the priority put on a transmission packet. TxRx is a time from the end of carrier-sensing to transmission of a packet and is a time corresponding to "1Unit" of FIG. 7. In this embodiment, the carrier-sensing time is changed by a time that is equivalent to an integer multiple of TxRx as a unit. Priority therefore takes an integer value. A packet having a higher priority therefore has a larger value of Priority.

Priority given in an integer is beneficial in simplifying the processing. Priority is, however, not necessarily an integer, which means that the amount of change in the carrier-sensing time is not necessarily given in an integer multiple of TxRx. For example, the communication controller 102 may assign 1 or a real number larger than 1 for Priority and obtains the amount of change that is equal to or larger than TxRx and is a real multiple of TxRx.

As described above, CCATime has limit values indicating the upper limit and the lower limit. The amount of change is therefore not allowed to fall outside the range between the limit values. The communication controller 102 compares CCAChangeBase with the limit values and calculates CCAChange. For example, the communication controller 102 calculates CCAChange using the following formula (3).

$$CCAChange = \begin{cases} \min\left(\frac{RxWait}{2}, CCALimit\right), & \text{if } CCAChangeBase > \min\left(\frac{RxWait}{2}, CCALimit\right) \\ CCAChangeBase, & \text{if } -\frac{RxWait}{2} < CCAChangeBase \leq \min\left(\frac{RxWait}{2}, CCALimit\right) \\ -\frac{RxWait}{2}, & \text{if } CCAChangeBase \leq -\frac{RxWait}{2} \end{cases} \quad (3)$$

RxWait indicates a time for which a receiver communication device 100 waits for the head of a packet. In FIG. 7, the time TsRxWait corresponds to RxWait in the formula (3). The receiver communication device 100 expects a packet to arrive at the midpoint of RxWait. If a packet transmission timing is shifted (in the positive and the negative directions) by a length of RxWait/2 for some reason, the packet cannot be received.

CCALimit is a value equivalent to the difference between CCABase and the minimum carrier-sensing time defined by ARIB Std-T108. In other words, CCALimit is given with the carrier-sensing time set at the minimum value of ARIB Std-T108.

The limit value of the shortest carrier-sensing time, in other words, the maximum value of CCAChange uses a smaller value of the values of RxWait/2 and CCALimit (min (RxWait/2, CCALimit) in the formula (3)).

The status of communication, based on which Priority is set, can use any information. For example, the status of communication can use at least one of the number (the number of failures in packet transmission or the number of repetitions of sending) of failures in packet transmission and the number of hops from the coordinator to the communication device 100. The type of information used as the status of communication can characterize the multi-hop network.

For example, in use of the number (the number of repetitions of sending) of failures in packet transmission as the status of communication, the priority may be increased with an increase in the number (the number of repetitions of sending) of failures in transmission. This manner can establish a multi-hop network where times taken for respective transmissions are smoothed and the maximum transmission time is reduced.

In use of the number of hops from the coordinator of the communication device 100 as the status of communication, the priority may be increased with a decrease in the number of hops. This manner allows such a multi-hop network to be established that is more suitable for a sensing system where packets are likely to be gathered at a communication device 100 close to the coordinator.

The priority may be increased with an increase in the number of hops, in other words, with an increase in the distance from the coordinator. This manner allows a communication device 100 away from the coordinator to easily obtain information of a beacon and to easily and quickly join the multi-hop network. A multi-hop network suitable for region extension thus can be established.

Various types of information can be employed as the status of communication, and the methods described in this embodiment are applicable for any type of information.

Modification

The communication device 100 illustrated in FIG. 4 includes both a function to change the carrier-sensing time and a function to synchronize time using timing information in a received packet. Of the functions, the communication device may include only the second function.

Figure 11:
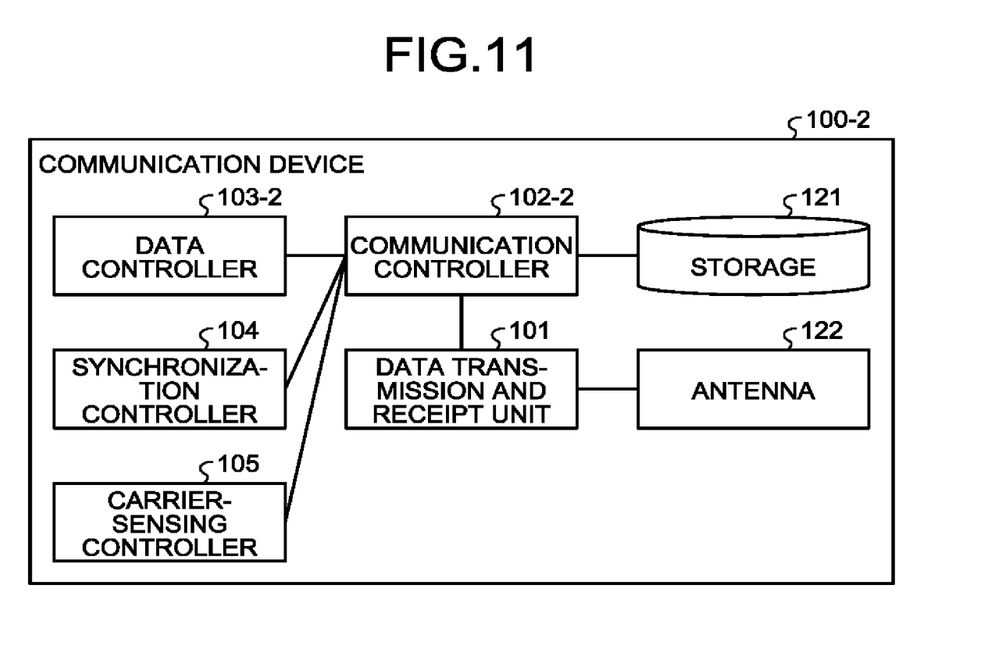
FIG. 11 is a block diagram of a communication device according to a modification.

FIG. 11 is a block diagram that illustrates an example configuration of a communication device 100-2 of a modification configured as above. As illustrated in FIG. 11, the communication device 100-2 includes the storage 121, the antenna 122, the data transmission and receipt unit 101, a communication controller 102-2, a data controller 103-2, the synchronization controller 104, and the carrier-sensing controller 105.

The communication device 100-2 of the modification is different from the communication device 100 of the above embodiment in the functions of the communication controller 102-2 and the data controller 103-2. Since the configuration is the same as that of FIG. 4 except the above units, like numerals indicate like components, and description thereof will be omitted.

The data controller 103-2 is different from the data controller 103 of the embodiment in that the data controller 103-2 has no functions to insert timing information, allowing identification of the end timing of carrier-sensing, into a transmission packet.

The communication controller 102-2 is different from the communication controller 102 of the embodiment in that the communication controller 102-2 has no functions to change the carrier-sensing time based on the priority of a transmission packet. The communication device 100-2 carries out packet receipt processing to receive a packet in the same procedure as that of FIG. 6.

The communication device 100-2 of the modification has a function to synchronize time using timing information included in a packet received from another communication device, however, it has no functions to change the carrier-sensing time. In this case, another communication device, if having the function to change the carrier-sensing time, can make carrier-sensing effective and maintain accuracy of time synchronization.

As described above, a communication device according to the embodiment is capable of changing the carrier-sensing time depending on the status of communication. The communication device is therefore capable of making carrier-sensing effective even in circumstances where time is accurately synchronized. Information allowing identification of the amount of change (the end timing of carrier-sensing) is included in a transmission packet. Time synchronization thus can be accurately maintained by referring to the information.

Figure 12:
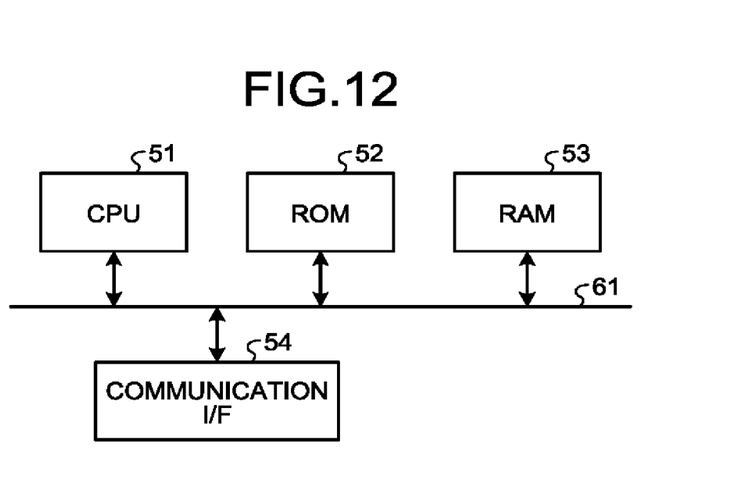
FIG. 12 is a diagram of a hardware configuration of the communication device of the embodiment.

Hardware configuration of the communication device according to the embodiment will now be described with reference to FIG. 12. FIG. 12 is a diagram of a hardware configuration of the communication device of the embodiment.

The communication device according to the embodiment includes a controller such as a CPU 51, a memory such as a read only memory (ROM) 52 and a RAM 53, and a communication I/F 54 to be connected to a network to establish communication, and a bus 61 to connect the units with one another.

A computer program executed by the communication device of the embodiment is previously embedded in the ROM 52 and other units and is provided.

The computer program executed by the communication device of the embodiment may be stored in a computer-readable memory medium such as a compact disc read only memory (CD-ROM), a flexible disk (FD), a compact disc recordable (CD-R), a digital versatile disc (DVD) in an installable or executable file, and provided as a computer program product.

The computer program executed by the communication device of the embodiment may be stored in a computer connected to a network such as the Internet and provided by being downloaded through the network. The computer program executed by the communication device of the embodiment may be provided or distributed through a network such as the Internet.

The computer program executed by the communication device of the embodiment allows the computer to function as the above units of the communication device. The CPU 51 of this computer is capable of loading the computer program from a computer-readable memory medium onto a main memory and executing the program.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   one or more processors configured to:
      synchronize time between the communication device and a different communication device using data transmitted and received by time division multiple access;
      determine an end timing of carrier-sensing in a time slot of the time division multiple access;
      control carrier-sensing to end at a determined end timing;
      generate data including first timing information as data to be transmitted to the different communication device, the first timing information allowing identification of the determined end timing;
      receive data including second timing information from the different communication device, the second timing information allowing identification of an end timing of carrier-sensing determined by the different communication device; and
      correct time based on the second timing information included in the received data and a receipt time of the received data.

2. The communication device according to claim 1, wherein the one or more processors determines the end timing that vary depending on priority of data to be transmitted.

3. The communication device according to claim 2, wherein the one or more processors sets the priority based on a status of communication.

4. The communication device according to claim 3, wherein the status of communication is at least one of number of failures to transmit data and number of hops from a communication device managing time used as a reference of synchronization.

5. The communication device according to claim 1, wherein the one or more processors generates data including the first timing information that indicates a difference between the determined end timing and a standard value.

6. The communication device according to claim 1, wherein the one or more processors generates data including the first timing information at a header or a certain location of a payload.

7. A communication device, comprising:
   one or more processors configured to:
      synchronize time between the communication device and a different communication device using data transmitted and received by time division multiple access conforming to time-slotted channel hopping (TSCH);
      determine an end timing of TsCca that is a carrier-sensing time period in a time slot of the time division multiple access conforming to TSCH;
      control carrier-sensing to end at a determined end timing;
      generate data including first timing information as data to be transmitted to the different communication device, the first timing information allowing identification of the determined end timing;
      receive data including second timing information from the different communication device, the second timing information allowing identification of an end timing of carrier-sensing determined by the different communication device; and
      correct time based on the second timing information included in the received data and a receipt time of the received data.

8. A communication device, comprising:
   one or more processors configured to:
      control transmission and receipt of data by time division multiple access and to receive data including timing information from a different communication device, the timing information allowing identification of an end timing of carrier-sensing determined by the different communication device, and
      correct time to be synchronized between the communication device and the different communication device based on the timing information included in the receive data and a receipt time of the received data.

9. A method of communication, comprising:
   controlling synchronization to synchronize time between a communication device and a different communication device using data transmitted and received by time division multiple access;
   controlling communication to determine an end timing of carrier-sensing in a time slot of the time division multiple access;
   controlling carrier-sensing such that carrier-sensing ends at a determined end timing;
   controlling data to generate data including first timing information as data to be transmitted to the different communication device, the first timing information allowing identification of the determined end timing;
   receiving data including second timing information from the different communication device, the second timing information allowing identification of an end timing of carrier-sensing determined by the different communication device; and correcting time based on the second timing information included in the received data and a receipt time of the received data.

10. A computer program product having a non-transitory computer readable medium including programmed instructions, wherein the instructions, when executed by a computer, cause the computer to perform:

controlling synchronization to synchronize time between a communication device and a different communication device using data transmitted and received by time division multiple access;

controlling communication to determine an end timing of carrier-sensing in a time slot of the time division multiple access;

controlling carrier-sensing such that carrier-sensing ends at a determined end timing;

controlling data to generate data including first timing information as data to be transmitted to the different communication device, the first timing information allowing identification of the determined end timing;

receiving data including second timing information from the different communication device, the second timing information allowing identification of an end timing of carrier-sensing determined by the different communication device; and correcting time based on the second timing information included in the received data and a receipt time of the received data.

\* \* \* \* \*